R. F. PARADIS.
PICTURE SCREEN FRAME PROJECTOR.
APPLICATION FILED NOV. 24, 1919.
1,349,580.
Patented Aug. 17, 1920.
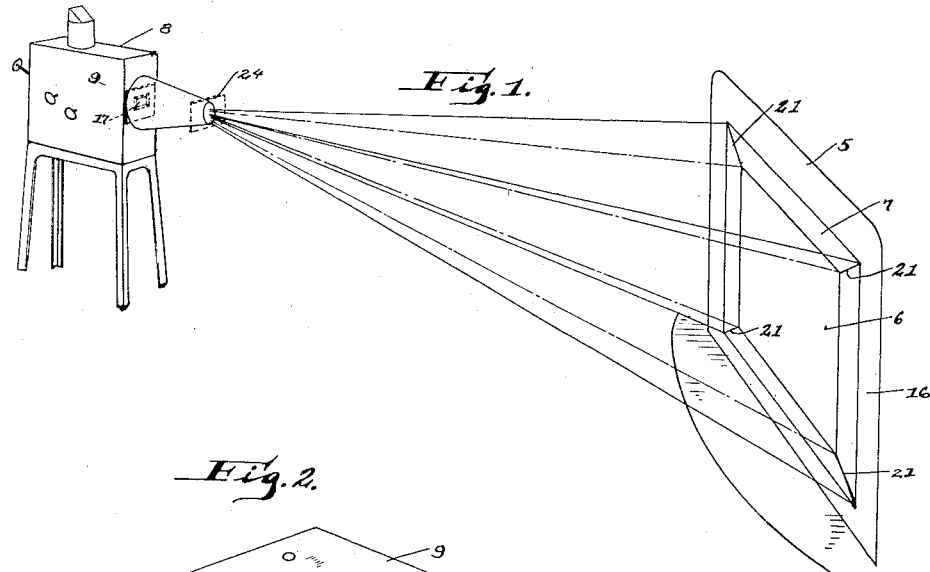
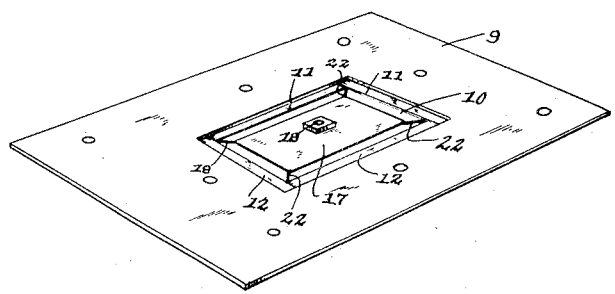
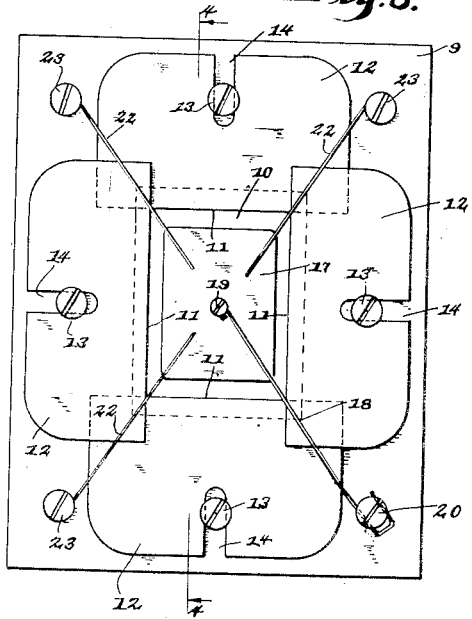
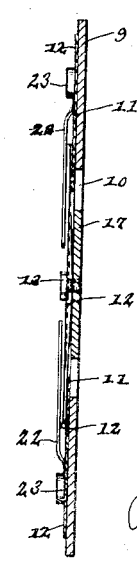
Inventor
Robert F. Paradis
By Morsell + Keeney
Attorneys.

UNITED STATES PATENT OFFICE.

ROBERT F. PARADIS, OF MILWAUKEE, WISCONSIN.

PICTURE-SCREEN-FRAME PROJECTOR.

1,349,580. Specification of Letters Patent. Patented Aug. 17, 1920.

Application filed November 24, 1919. Serial No. 340,276.

*To all whom it may concern:*

Be it known that I, ROBERT F. PARADIS, a citizen of the United States, and resident of Milwaukee, in the county of Milwaukee and State of Wisconsin, have invented new and useful Improvements in Picture-Screen-Frame Projectors, of which the following is a description, reference being had to the accompanying drawings, which are a part of this specification.

The present invention relates to a device for projecting a color frame about a moving picture screen field and has for one of its objects to provide means whereby the size of said frame may be readily adjusted.

Another object of my invention is to provide a slide plate member for projecting a rectangular frame about a moving picture screen field which may be adjusted to throw a colored light over the entire picture screen field or else to throw a rectangular frame surrounding the moving picture screen field.

A further object of this invention is to provide a device of this class which may be readily adjusted and which may be employed to throw a frame of any color.

With the above and other objects in view which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a perspective view of a moving picture screen and a projecting or stereopticon machine in connection with which my device is employed.

Fig. 2 is a perspective view of my device.

Fig. 3 is a bottom plan view thereof, and

Fig. 4 is the sectional view taken through my device on the line 4—4 of Fig. 3.

Referring now more particularly to the accompanying drawing the numeral 5 designates a picture screen having a picture field 6 on which the picture is projected from a machine (not shown). My invention is adapted to project a rectangular frame 7 about the field 6 in order to serve as a relief to the picture and set the same off more prominently and said frame is projected from a stereopticon machine or projector 8, the rays of which are projected through an opening in a slide plate 9, now about to be described.

The slide plate 9 is preferably of metal and has a rectangular opening 10 therein provided with readily adjustable sides 11 formed by extensions 12 adjustably secured to one side of the plate 9 by means of securing screws 13 passing through elongated slots 14 in said extensions. By this construction it will be readily seen that the width and length of the opening may be readily varied and that the location of the opening with reference to the edges of the plate 9 may be adjusted to properly focus and position the outer edge 16 of the frame 7 on the screen 5. When it is desired to color the entire picture being thrown upon the field 6 the plate 9 is employed as described, but when it is desired to provide only a rectangular border about the picture field 6 a rectangular center plate 17 is provided having its edges spaced from the sides of the opening 10.

The plate 17 is adjustably connected with the plate 9 by means of a wire or other brace member 18 secured to the plate 17 as at 19 and to the plate 9 as at 20. The connection 20 is such that the plate 17 may be adjusted as desired. The wire 18 bisects the adjacent corner of the plate 17 and the opening 10 and consequently a dark diagonal line 21 is projected upon the screen 5 and in order to have a line 21 at all the corners of the frame 7 I provide wire members 22 secured to the plates 9 by fastenings 23 and bisecting the other adjacent corners of the plate 17 and opening 10.

In use the slide 9 is placed within the path of the light ray of the machine 8 and the light ray is then interrupted and divided into the rectangular frame and in order to obtain the desired color frame a colored translucent plate 24 is placed within the path of the light rays as will be readily obvious to those skilled in the art to which an invention of this character appertains.

What I claim for my invention is:

1. A device for projecting a frame about a picture screen field comprising a slide plate having an opening therein, a center plate positioned within said opening with its edges spaced from the adjacent sides of the opening, a securing member having one end secured to the center plate and its other end secured to the slide plate, and means spaced from the securing member and extending from the center plate to the slide plate whereby the frame will be substantially uniform.

2. A device for projecting a rectangular color frame about a moving picture screen field comprising a slide plate having a rectangular opening therein, adjustable sides for said opening, a rectangular plate having its edges spaced from the adjacent sides of the opening, a securing member having one end secured to the rectangular plate and its other end secured to the slide plate, said securing member bisecting adjacent corners of said plates, and means bisecting the other adjacent corners of said plate whereby the color frame will be uniform.

3. A device for projecting a color frame about a moving picture screen field comprising a slide plate having a central opening therein, a central plate of less area than said opening and fitted therein with its edges spaced from the adjacent sides of said opening, a securing member having one end adjustably secured to the slide plate and its other end secured to the central plate, and means spaced from the securing member and extending from the central plate to the slide plate whereby the frame will be substantially uniform.

4. A device for projecting a color frame about a moving picture screen field comprising a slide plate having a central opening therein, a central plate of less area than said opening and fitted therein with its edges spaced from the adjacent sides of said opening, means adjustably maintaining said central plate in said opening, and extension members adjustably secured to said slide plate and movable to vary the space between the edges of said central plate and the edges of the opening whereby the width of the frame may be adjusted.

In testimony whereof, I affix my signature.

ROBERT F. PARADIS.